Nov. 15, 1932.  V. T. HOEFLICH  1,888,197
MACHINE FOR MAKING CONVOLUTED STRUCTURES OF FLEXIBLE MATERIAL
Filed Oct. 20, 1928   10 Sheets-Sheet 1
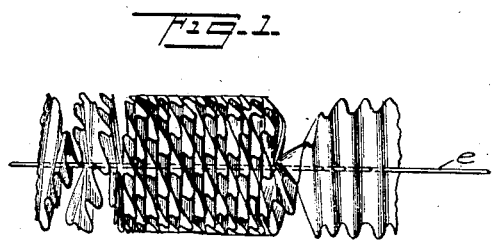
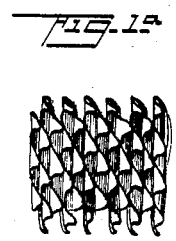
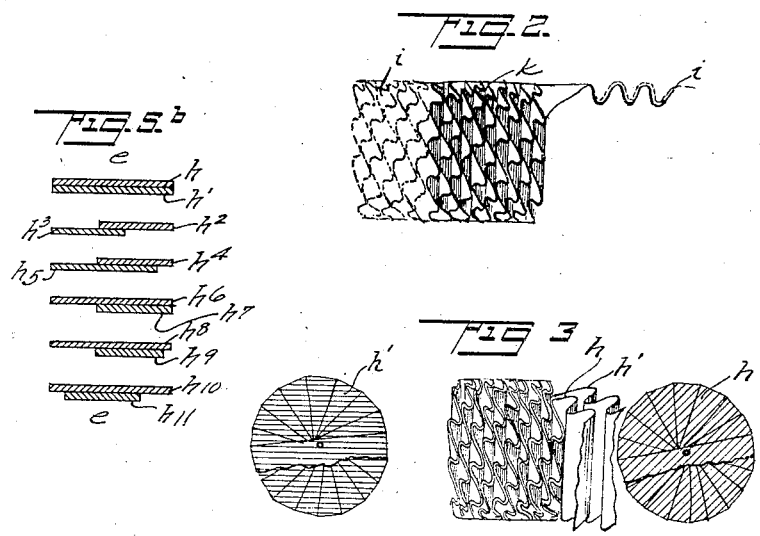
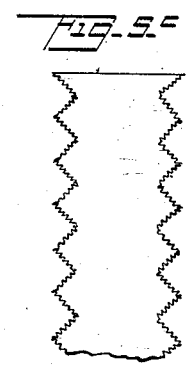
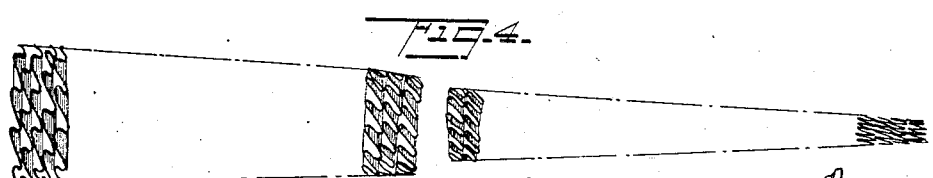
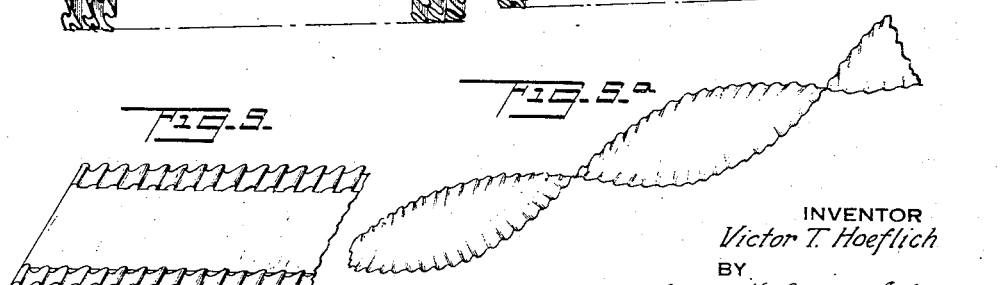
INVENTOR
Victor T. Hoeflich
BY
ATTORNEYS Nov. 15, 1932.　　　V. T. HOEFLICH　　　1,888,197
MACHINE FOR MAKING CONVOLUTED STRUCTURES OF FLEXIBLE MATERIAL
Filed Oct. 20, 1928　　10 Sheets-Sheet 2
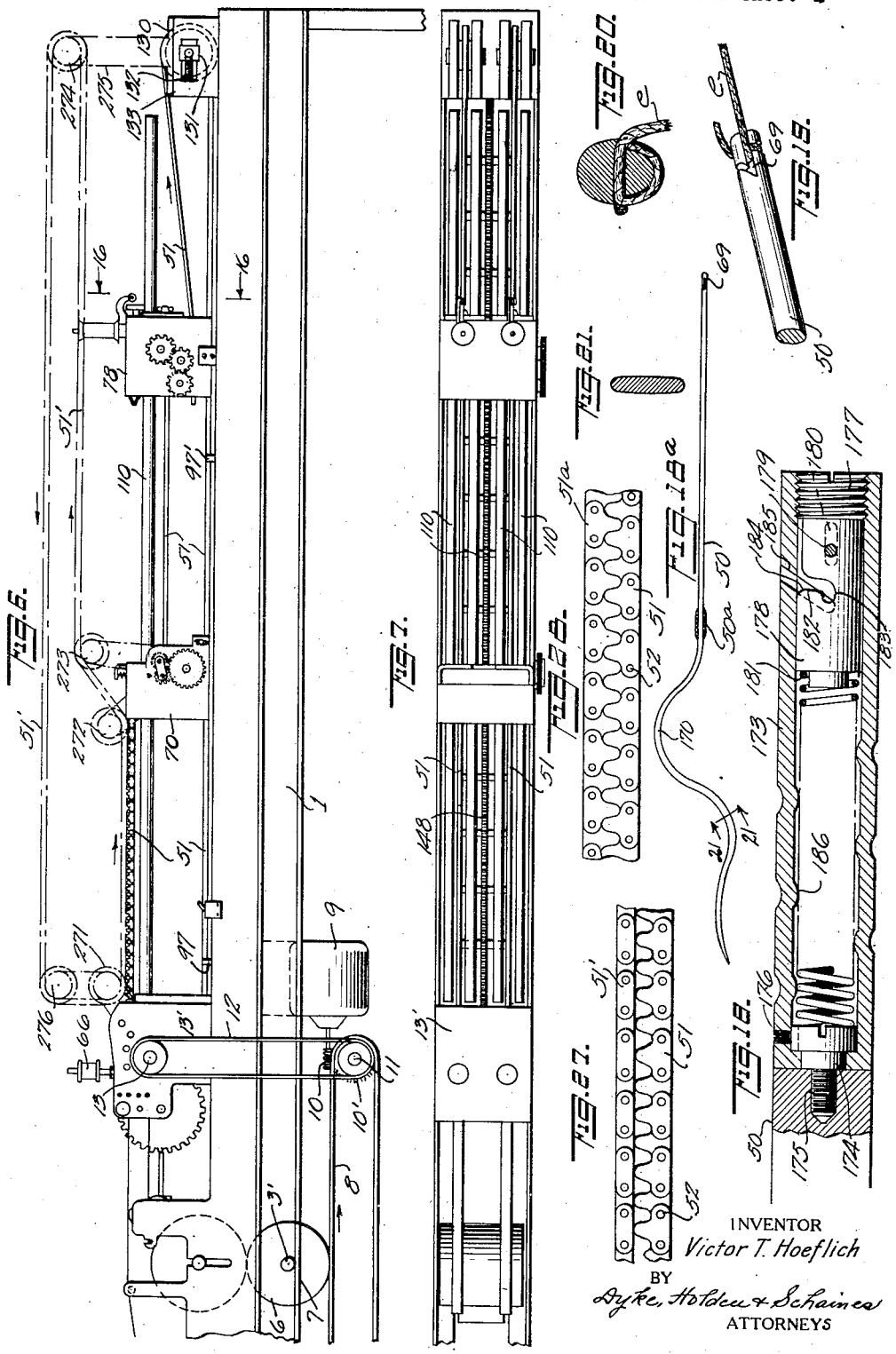
INVENTOR
Victor T. Hoeflich
BY
Dyke, Holden & Schaines
ATTORNEYS

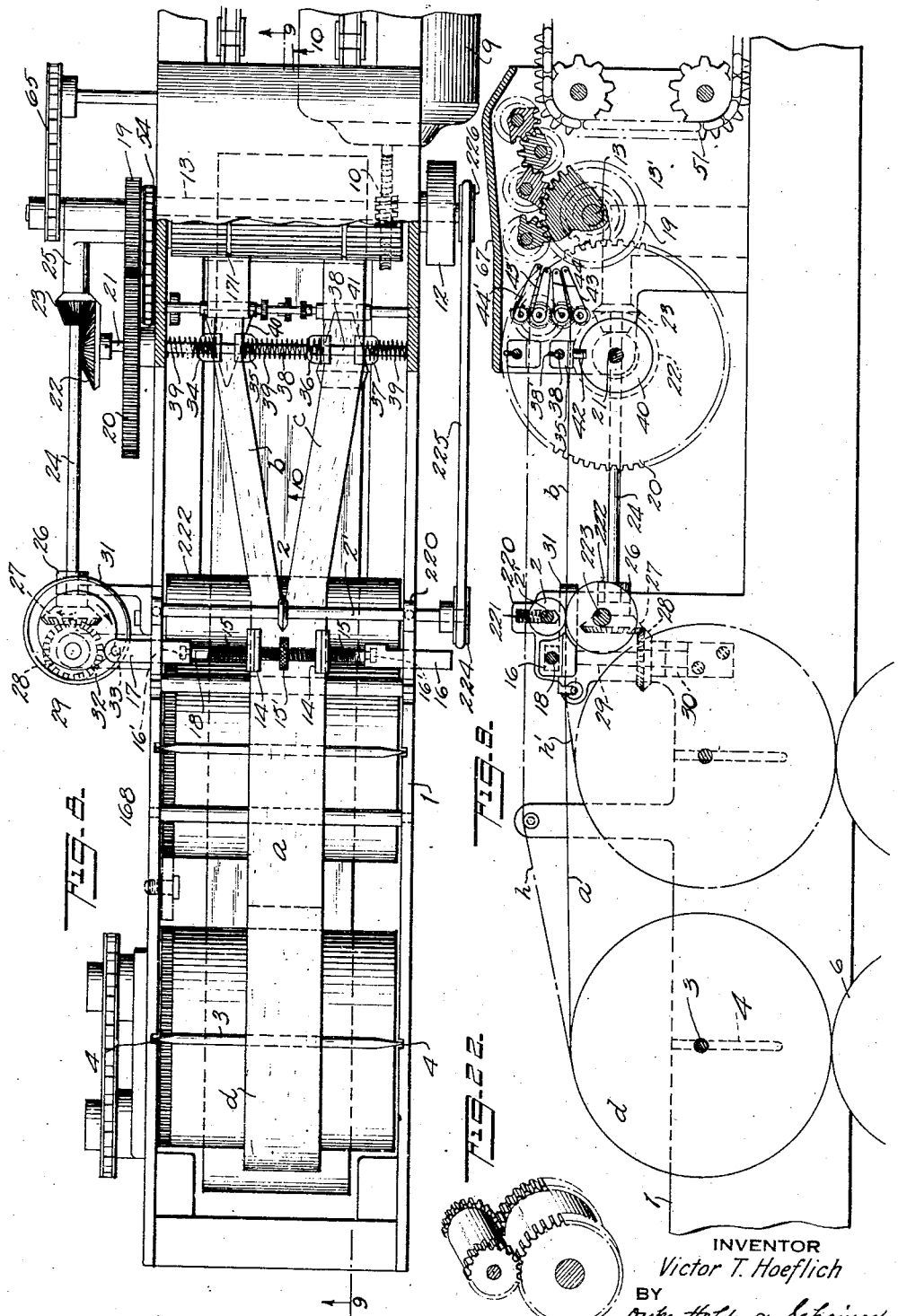

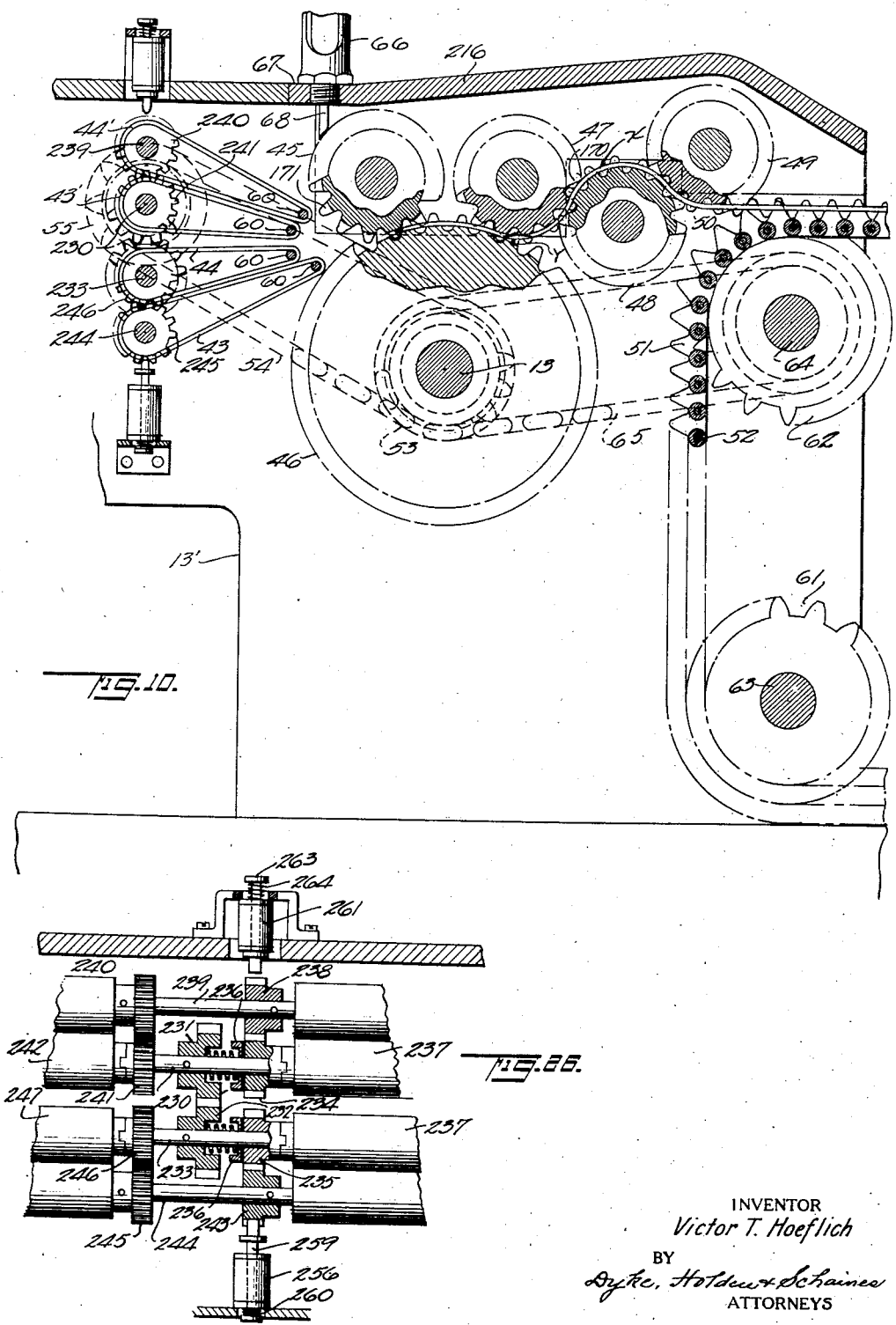

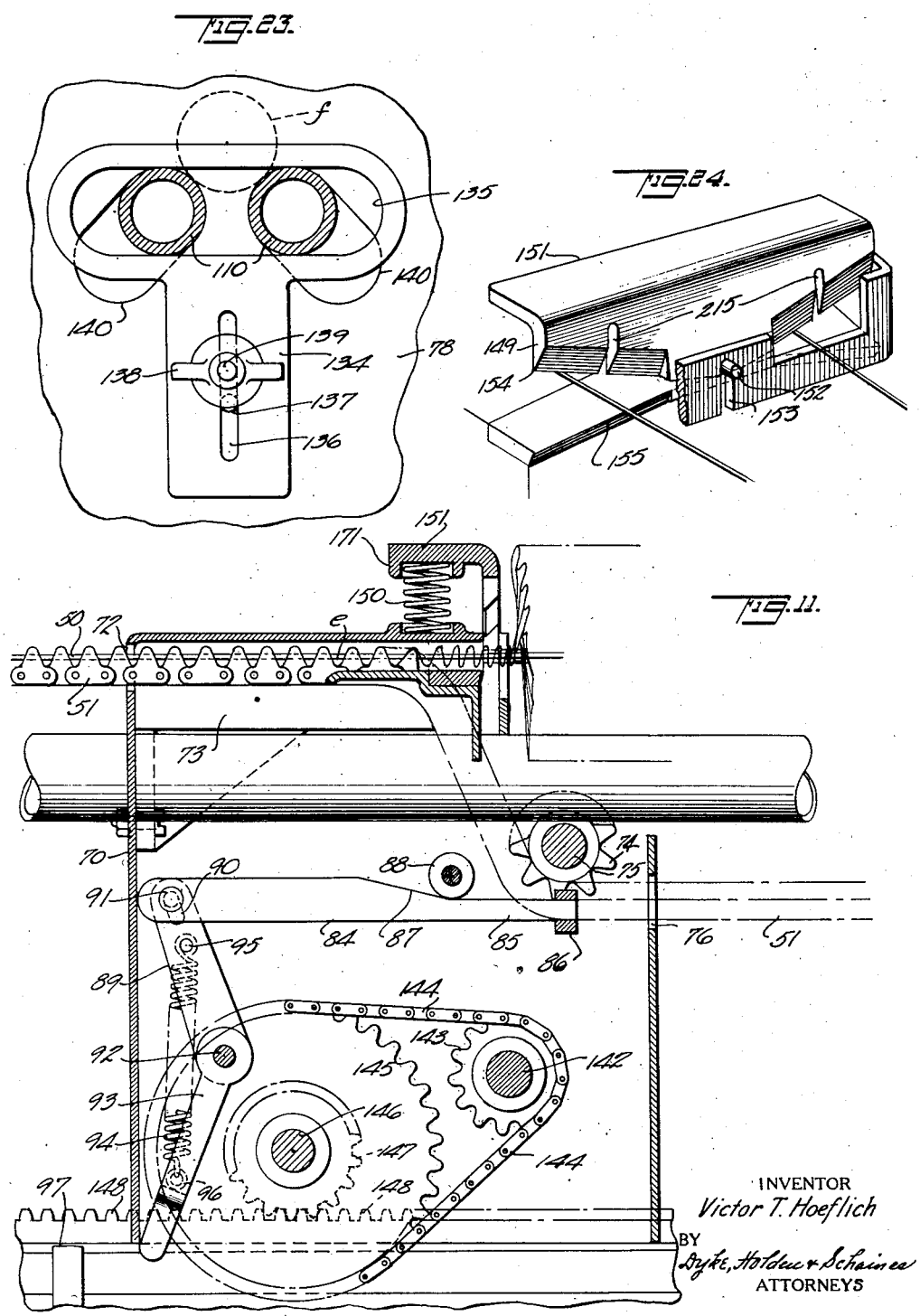

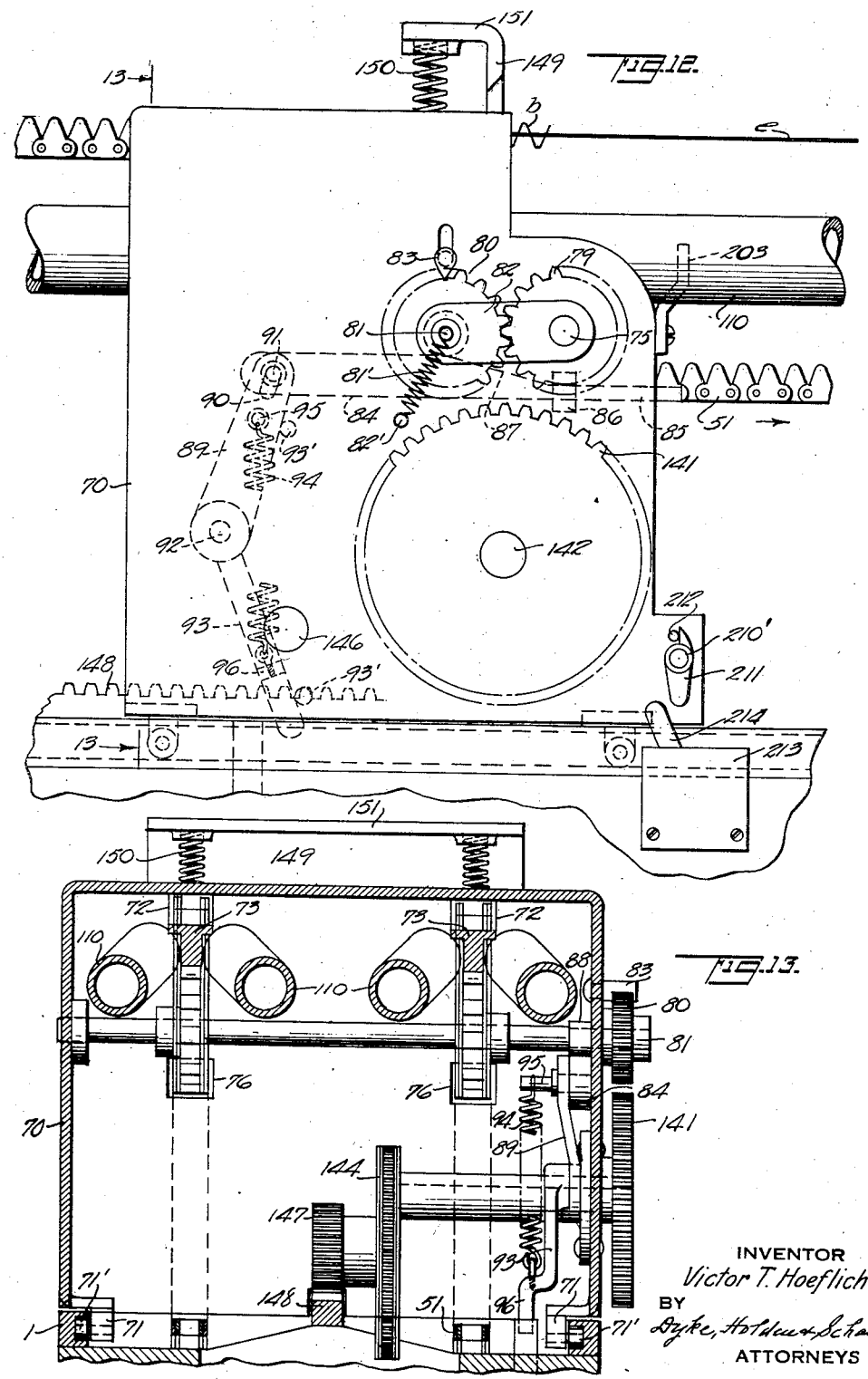

Nov. 15, 1932. V. T. HOEFLICH 1,888,197
MACHINE FOR MAKING CONVOLUTED STRUCTURES OF FLEXIBLE MATERIAL
Filed Oct. 20, 1928    10 Sheets-Sheet 7
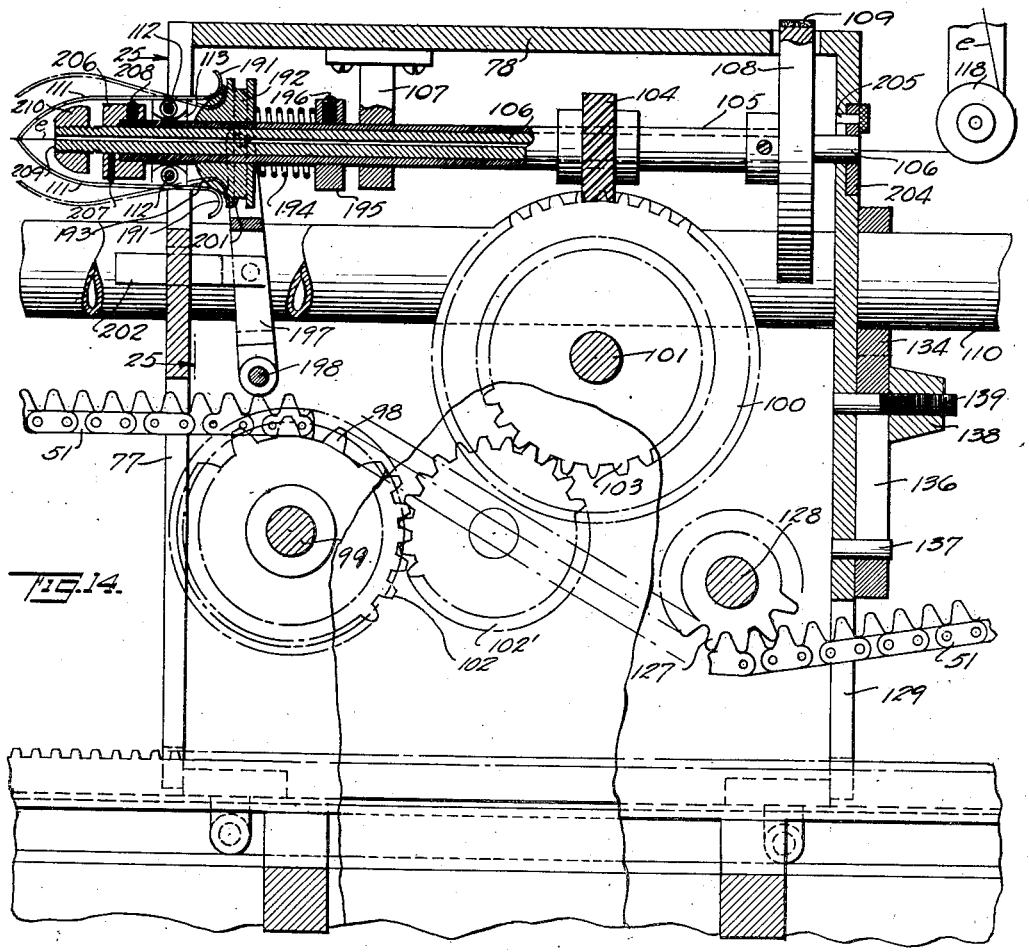
INVENTOR
Victor T. Hoeflich
BY
Dyke, Holden & Schaines
ATTORNEYS Nov. 15, 1932.  V. T. HOEFLICH  1,888,197
MACHINE FOR MAKING CONVOLUTED STRUCTURES OF FLEXIBLE MATERIAL
Filed Oct. 20, 1928   10 Sheets-Sheet 8
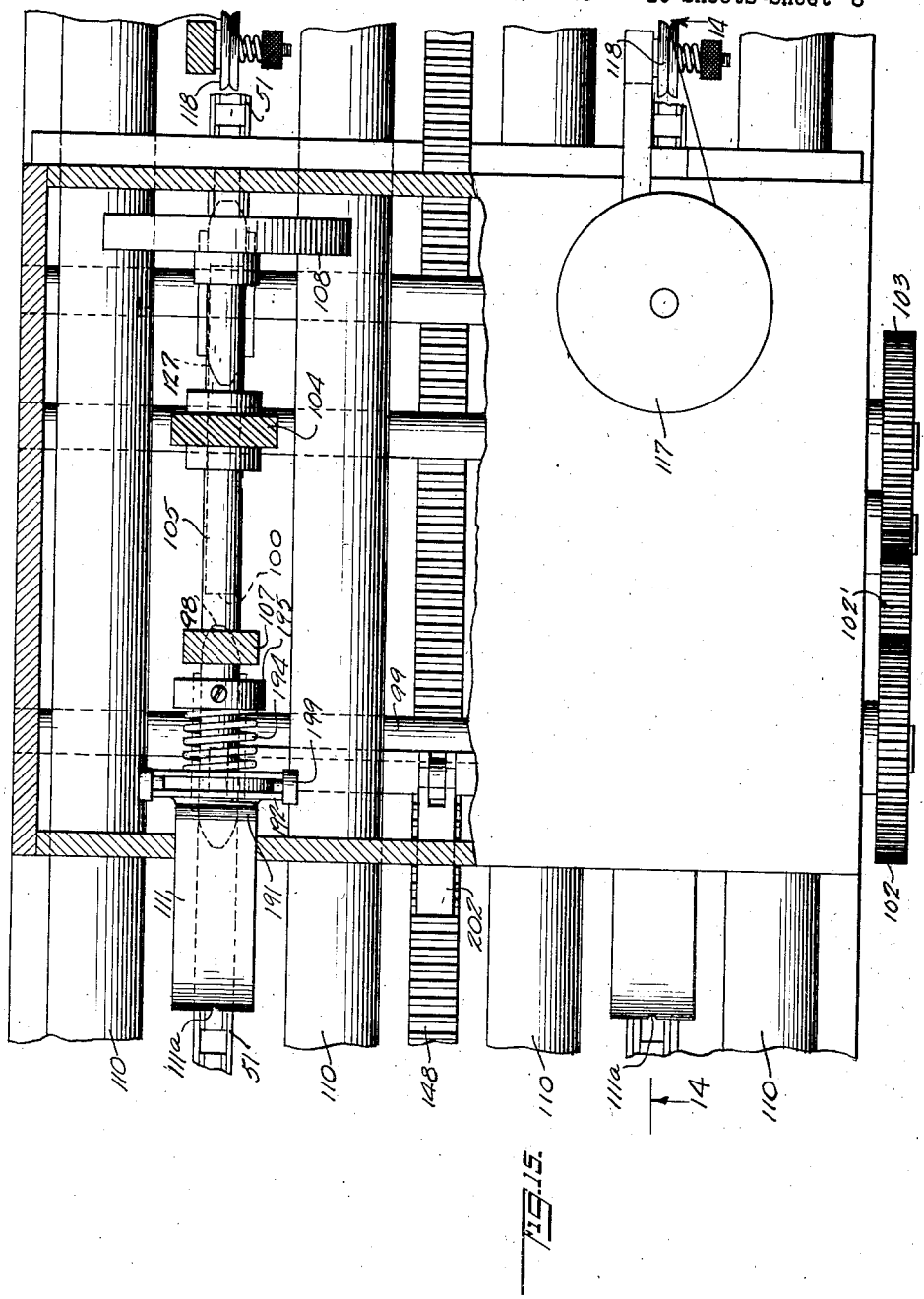
INVENTOR
*Victor T. Hoeflich*
BY
*Dyke, Holden + Schaines*
ATTORNEYS

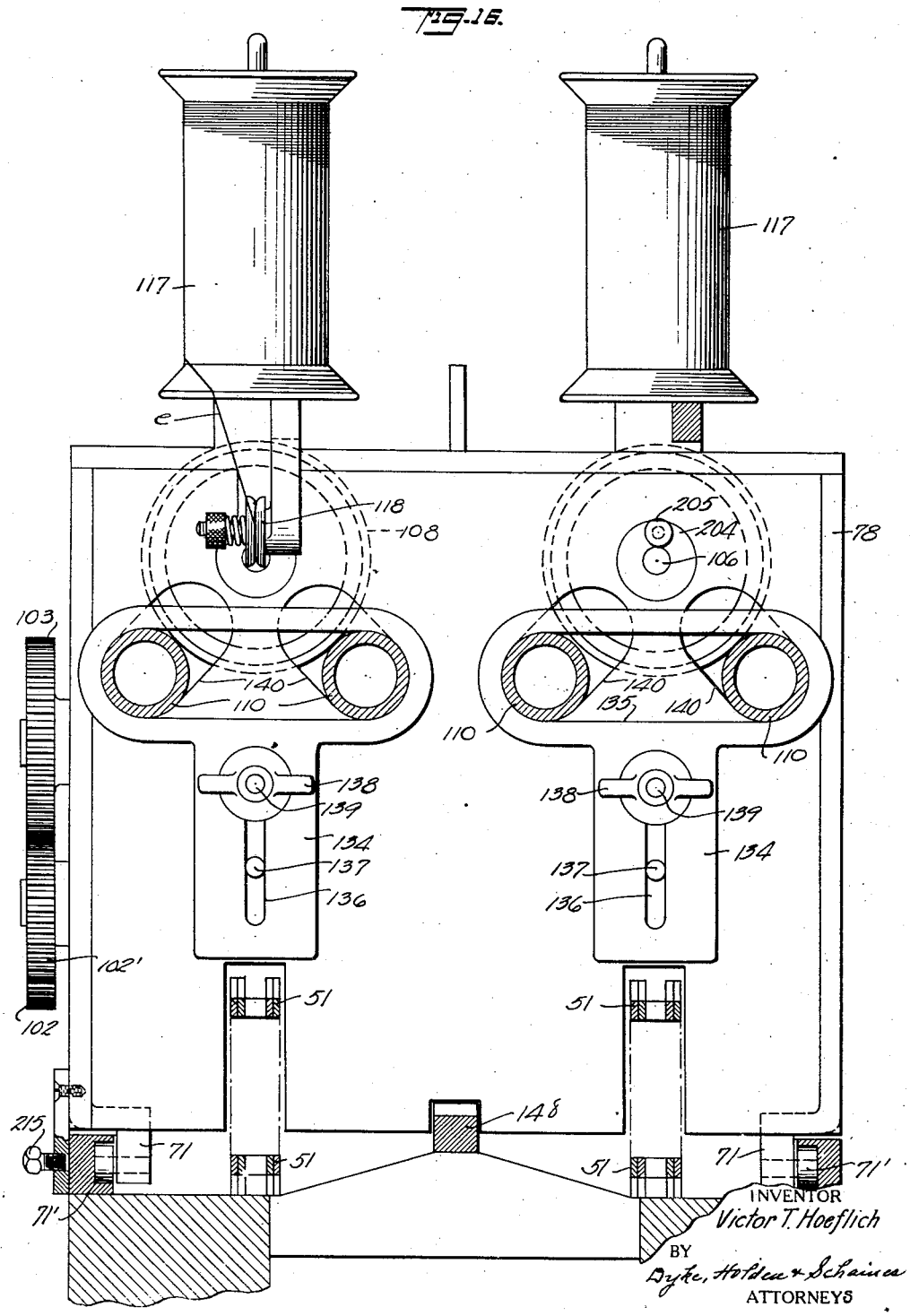

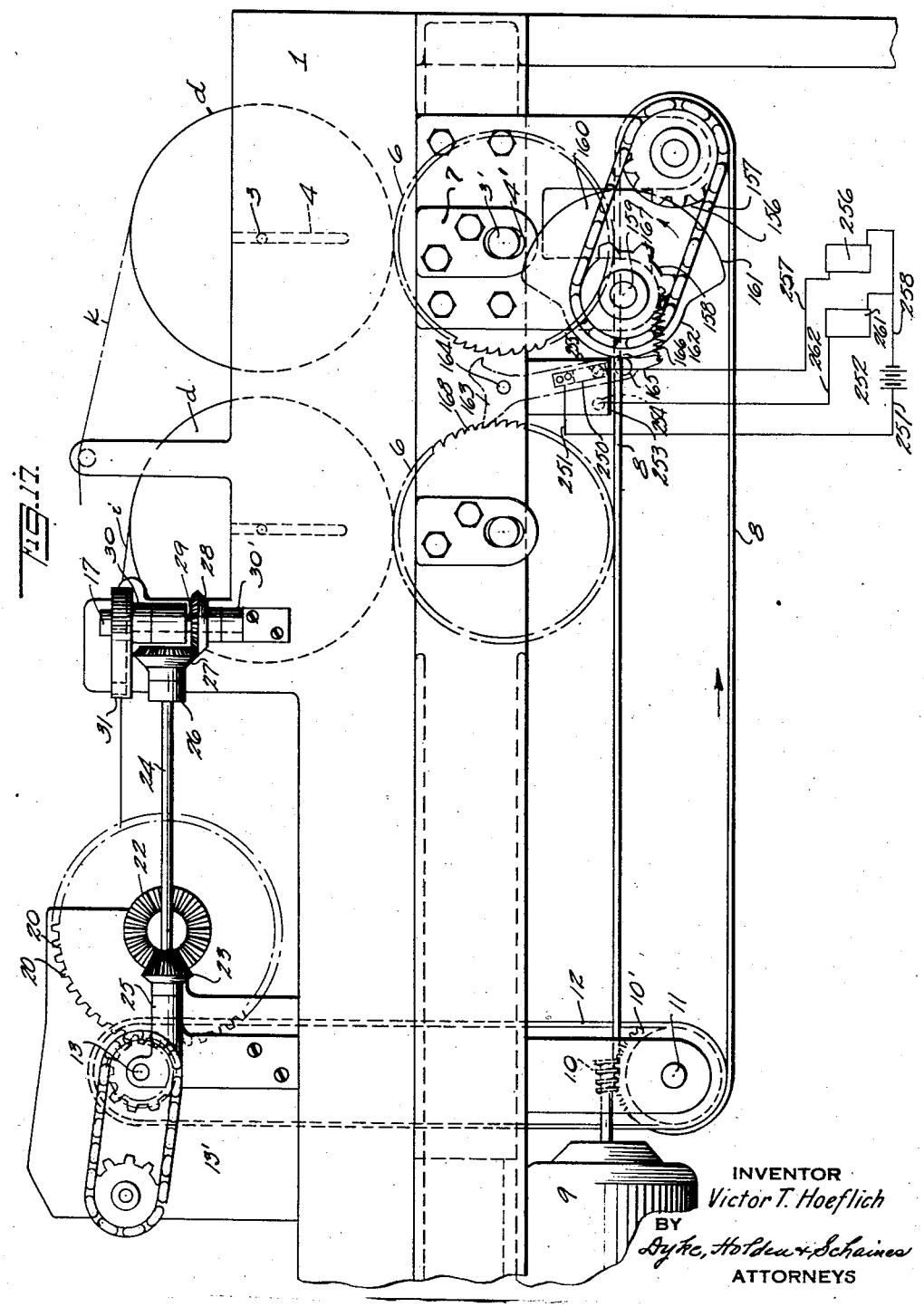

Patented Nov. 15, 1932

1,888,197

UNITED STATES PATENT OFFICE

VICTOR T. HOEFLICH, OF NEW YORK, N. Y., ASSIGNOR TO AMERICAN MERRI-LEI CORPORATION, OF NEW YORK, N. Y., A CORPORATION OF NEW YORK

MACHINE FOR MAKING CONVOLUTED STRUCTURES OF FLEXIBLE MATERIAL

Application filed October 20, 1928. Serial No. 313,711.

My invention relates to machines for the manufacture of convoluted structures of flexible material, more particularly of the type in which the article is formed of a strip or strips of flexible material, for example crepe paper, which is crimped and impaled on spitted upon a core, such as a thread or wire, and thereafter compacted and twisted to form an ornamental or useful device.

My invention is adapted to the simultaneous manufacture of a plurality of articles, and by simple changes, such as may be readily made by the removal or addition of attachments, the same apparatus may be used for the production of several different types of convoluted structures.

Heretofore it has been the usual practice to manufacture structures of this character largely, if not entirely, by hand, which is necessarily a somewhat slow process and unduly increases the cost of the finished product. One of the principal objects of my invention is the doing away with hand operation and the forming of complete structures several feet in length by the substantially continuous action of a machine, which requires only the removal of the finished article and the rethreading of the needle at periodic intervals to enable it to continuously manufacture articles from a roll of crepe paper or other flexible material.

By reason of the practically continuous action of this machine, the structures are quickly and cheaply produced and are of improved and highly desirable and attractive appearance owing to their perfection in detail.

My invention has for its further object the designing of the various machine elements so that the same will operate over long periods of time with a minimum of care, attention and repairs, and so that a maximum number of articles may be produced in a minimum time.

Reference is hereby made to the accompanying drawings, of which:

Fig. 1 is a side elevation of a convoluted structure formed from a single strip of crepe paper of uniform width by means of my improved machine.

Fig. 1a is a similar view of a structure formed from a single strip of uniform width, with the core off center as regards the strip.

Fig. 2 is a similar view of a structure formed in successive blocks from portions of differently colored crepe paper strips of uniform width.

Fig. 3 is a similar view, together with end views of a structure formed from two superimposed strips of differently colored crepe paper of uniform width.

Fig. 4 is a similar view of a structure formed from a single tapering strip of crepe paper.

Fig. 5 is an isometric view of a strip of crepe paper having the edges or marginal portions thereof formed with crimps as an initial step toward the forming of a special structure therefrom.

Fig. 5a is a perspective of a strip of structure formed from the strip of Fig. 5.

Fig. 5b is a view illustrating in transverse section various combinations of two superimposed strips and core, whereby structures of the type of that shown in Fig. 3 may be formed, but which will differ greatly in appearance from such structure and from each other.

Fig. 5c is a plan view of a strip having irregularly shaped edges which may be substituted for any of the strips shown in other views to produce a structure differing greatly in appearance from those produced from such other strips.

Fig. 6 is a side elevation of a machine constructed in accordance with my invention, a portion thereof at the extreme left being broken away.

Fig. 7 is a plan view of the machine of Fig. 6.

Fig. 8 is a plan on an enlarged scale of the extreme left end of the machine of Figs. 6 and 7, also showing the portions which do not appear in said views.

Fig. 9 is a section on line 9—9 of Fig. 8.

Fig. 10 is a section of line 10—10 of Fig. 8.

Fig. 11 is a vertical section of the distributing carriage.

Fig. 12 is a side elevation of the distributing carriage.

Fig. 13 is a section on line 13—13 of Fig. 12.

Fig. 14 is a vertical section of the spinning head of the machine.

Fig. 15 is a plan view partly in horizontal section of the mechanism of Fig. 14.

Fig. 16 is a section on line 16—16 of Fig. 6.

Fig. 17 is a side elevation of an attachment for producing structures of the block type shown in Fig. 2.

Fig. 18 is a detail section, greatly enlarged, of one end of a preferred form of needle for spitting the strip.

Fig. 18a is a side elevation of the needle with the holder of Fig. 18 removed therefrom.

Fig. 19 is an enlarged perspective view of one end of the needle of Fig. 18a showing a manner of threading same.

Fig. 20 is a transverse section of the end of the needle of Fig. 19.

Fig. 21 is a section on line 21—21 of Fig. 18a.

Fig. 22 is an isometric view of a pair of crimping rolls for producing the strip of Fig. 5.

Fig. 23 is a detail of the adjustable support for a pair of the elongated rollers which aid in the twisting operation.

Fig. 24 is a perspective view of the cutter for severing the core after the convoluted structure has been formed.

Fig. 25 is a section on line 25—25 of Fig. 14.

Fig. 26 is a front elevation of the means for feeding the strip or strips to the crimping rolls, together with means for driving, locking and unlocking said feeding means.

Fig. 27 is a detail side view of the toothed chain for receiving the strip as it leaves the crimping rolls, with holding chain superimposed thereon.

Fig. 28 is a similar view of a modification in which the upper chain is provided with downwardly extending teeth.

The machine illustrated in the drawings is provided with attachments for producing a complete structure of tapering form as shown in Fig. 4, which may be termed a fox tail. By slight changes, which will be described, the same machine can be used for producing the structures shown in Figs. 1, 1a, 2, 3, 5 and 5a.

In the device illustrated, the mechanism is supported by an elongated frame 1, and is suitable for the simultaneous production of two structures, from paper strips arranged side by side and parallel to each other. In forming structures of the fox tail type, in which the strip tapers from end to end, the two structures will be simultaneously formed from a single strip which will be severed as it advances through the machine by a knife or cutter so that two strips will be formed therefrom, one of which is widest at its forward end and tapers in a rearward direction, whereas the other is narrowest at its forward end and becomes wider toward the rear. Fig. 8 shows a single strip of crepe paper a, which is being severed by a circular knife or cutter 2 into two tapering strips b and c. The strip c is being fed into guiding mechanism at the right hand side of the machine as viewed in the direction of travel of the strip, and the strip b is being fed into the guiding mechanism at the left hand side of the machine. Fig. 9 shows a roll d of crepe paper from which the wide strip a is being fed. This roll is carried by a pin or spindle 3, the ends of which engage vertical grooves or guides 4 in the side members of the frame 1. These ends are preferably pointed, as shown to facilitate the inserting of the pin through a roll of paper. The paper roll d rests upon a driving roll 6 which is provided with a pin 3' (Fig. 17) guided and retained in position by a bracket 7 bolted to frame 1 and having a slot 4'. The weight of the drive roll 6 and paper roll d is carried by a belt 8 and the roll 6 is driven thereby.

The means for driving the belt 8 and other parts of the machine comprises an electric motor 9 (Figs. 6 and 17) upon the shaft of which is a spiral gear 10 which drives a similar gear 10' mounted on the horizontal shaft 11. Said shaft 11 is provided with pulleys for driving the horizontal belt 8 previously described and also a vertical belt 12 for driving the horizontal shaft 13 of the spitting head 13' to be later described.

The paper strip a as it leaves the roll d and passes into the machine is properly positioned by a pair of guides 14, 14 Fig. 8, which engage its edges. These guides are threaded upon a rotatable rod 18 having oppositely arranged screw threads 15, 15, and may be laterally adjusted thereby to vary the distance between them. The rod 18 is rotatably mounted in bearing blocks 16 and 17 and provided with a knurled collar 15' for conveniently rotating same to effect said adjustment. The bearing blocks 16 and 17 are formed with bearings 16', so shaped as to engage the groove ends of the rod 18 and prevent longitudinal movement thereof with respect to the bearing. Means are provided for causing longitudinal reciprocatory movement of said rod 18, whereby the strip a will be moved laterally with respect to the cutter 2 to produce the tapering strips b and c previously described. The means for causing such reciprocatory movement is as follows: (Figs. 8, 9 and 17). Upon one end of the horizontal shaft 13 is mounted a spur gear 19 which meshes with a similar gear 20 of large diameter fixed to a horizontal shaft 21. Bevel gear 22 is mounted on the outer end of said shaft and engages a similar gear 23 mounted upon a horizontal shaft 24 rotatably supported in the bearings 25 and 26. The rear end of the shaft 24 carries a bevel gear 27 which engages a similar gear 28 mounted on a vertical shaft 29. The shaft 29 is mounted in bearings 30 and 30' supported by the frame and upon its upper end is fixed a horizontal cam or eccentric 31 having a groove 32 which engages a roller 33 carried by the member 17.

The cutter 2 is mounted on shaft 2', and the latter is supported at its ends in bearings vertically movable in slotted brackets 220, their upward movement being opposed by coil springs 221. The cutter coacts with a roller 222 mounted on shaft 223 which is supported by frame 1. Upon one end of said shaft is a pulley 224 and the same is driven by a belt 225 and pulley 226, the latter being fixed to shaft 13.

The strips $b$ and $c$ into which the strip $a$ is formed by the cutter 2 are caused by spring-pressed guides 34, 35, 36 and 37 to diverge so as to be acted upon by laterally separated parts of the machine. These guides are slidable upon a horizontal rod 38.

On account of the fact that the widths of said strips are not constant but the strips are uniformly tapering, means are provided for automatically varying the distance between the guides 34 and 35 and between the guides 36 and 37 so as to correspond with the widths of said strips $b$ and $c$ respectively. Such means consist of cams 40 and 41 mounted on the shaft 21'. The outer surfaces of said cams are arranged to co-operate with pins 42 depending from the said guides and spiral springs 39 loose upon rod 38 are provided, as shown, for the purpose of holding the pins against the surfaces of the cams.

The course of the strip $b$ will now be followed, and it should be understood that strip $c$ will be acted upon in a similar way by a duplicate set of apparatus, so that two complete structures will be formed simultaneously, one from the strip $b$ and the other from the strip $c$.

As the strip $b$ leaves the guides 34 and 35, it passes between a pair of endless belts 43 and 44 of the spitting head 13' (see Figs. 9 and 10), which serve to feed the strip into the crimping rolls 45 and 46. These rolls are provided with teeth which engage each other and cause the strip which passes between them to be formed into a series of transverse folds, plaits or crimps corresponding in outline to the shape of the teeth. Beyond the crimping rolls 45 and 46 are additional rolls of a similar character 47, 48 and 49, each of which is provided with teeth for engaging the crimps in the strip as will be apparent. The top of the head 13' is preferably formed as a separate piece 216 (Fig. 10) and the rolls 45, 47 and 49 are carried thereby. This construction permits a yielding of such rolls in a vertical direction in order to take care of irregularities in the thickness of the strip $b$, as for example when two pieces are spliced by overlapping, and also permits the easy insertion or removal of the needle.

The crimping teeth of each of the rolls referred to are provided with grooves 171 to permit the insertion of a needle 50 of the form shown. Said needle is curved to conform to the curvature of the various crimping rolls, and its forward end is so shaped as to fit within a portion of the endless chain 51.

The form of the needle is of the greatest importance and the crimping rolls and chain 51 must be designed and arranged for co-operation therewith. The resistance offered by the crepe paper strip to the spitting operation imposes a considerable thrust upon the needle which must be so supported as to resist the thrust as otherwise it would be carried forward by the strip. For this reason a bend 170 is formed in the needle, the rear part of which (nearest the needle point) will bear against the roll 48 and the forward part against the roll 49. The bend 170 and the other bends of the needle should be on gentle curves on a long radius as shown in order to prevent distortion or crystallization. Abrupt curves should be avoided.

The needle is held in position by the crimping rolls. It cannot move laterally since it occupies a narrow groove in each of the rolls. It is held against upward movement by the rolls which are above it and against downward movement by the rolls below it. It resists the thrust caused by the spitting of the paper by reason of the bend 170.

In order to stiffen the needle against bending in a vertical plane and to prevent distortion or crystallization thereof the same is preferably flattened between the points $x$ and $y$ Fig. 10, (see also Figs. 18a and 21) so as to have a cross-section of increased height or depth.

Another necessary factor is to form the grooves 171 of the crimping rolls of such depth that when the needle is at the bottom of the groove, the central axis of the needle will coincide with the pitch line of the gear teeth of the crimping roll. Furthermore the point of the needle should be substantially in the line joining the centers of the gears 45 and 46.

As the strip is engaged and fed forward by the crimping rolls, it is spitted or impaled upon the needle. The gear teeth of the various crimping rolls serve not only to form and maintain the crimps or folds, but also as feeding devices for moving the crimped strip along the needle preserving the form of the crimps and preventing any compacting thereof. As the strip leaves the roll 49 it engages and lies upon the endless chain 51 which is formed of a large number of links secured together by pins 52. This chain is of small cross-section and light metal construction for the purpose of minimizing sag. A portion of the needle lies in a space formed between the pairs of teeth with which each link of the chain 51 is provided, so that said teeth may engage the successive crimps of the strip and act as feeding means to cause the strip to become impaled or spitted upon the remaining portion of the needle and thereafter upon the core $e$.

Since the teeth of the crimping rolls and chain maintain the crimps against compression, the resistance against moving them along the needle and the core is minimized.

By drawing the core taut at the beginning of the operation it will be so maintained and will aid in supporting the needle and in enabling it to withstand and absorb the thrust due to the spitting thereon of the strip. The chain also assists to the same end.

The means for driving the belts 43 and 44, the crimping rolls or gears 45 to 49 and chain 51 is as follows: (Figs. 10 and 26). The crimping gear 46 is fixed to the horizontal driven shaft 13 previously described and by engagement of its crimping teeth with those of the gear 45 drives the latter and also in a similar manner the gear 47. The gears 48 and 49 are driven by gear 47. The shaft 13 is provided with a sprocket 53 which by means of chain 54 and sprocket 55 drives the horizontal shaft 230 and the latter by means of the gear 231 and 232 drives the horizontal shaft 233.

The gears 231 and 232 being constantly driven, respectively drive the gears 234 and 235 through the friction clutches 236. Said gears 234 and 235 are loosely mounted on shafts 230 and 233 and are keyed as shown to the ends of the rollers 237 also loose on said shafts and by which the right hand belts 43' and 44 are driven. The gear 234 meshes with a gear 238 which is pinned to the shaft 239 and thereby drives the said shaft and rollers by which the belts 44' are actuated. A gear 240 fixed to shaft 239 meshes with a gear 241 loose on shaft 230 and keyed to roller 242 also loose on said shaft for driving the left hand belt 43'.

The gear 235 meshes with a gear 243 pinned to the shaft 244 and thereby drives the said shaft and rollers by which the belts 43 are actuated. A gear 245 fixed to shaft 244 meshes with a gear 246 loose on shaft 233 and keyed to roller 247 also loose on said shaft for driving the left hand belt 44.

Idlers 60 are provided for supporting the forward ends of said belts.

The chain 51 travels over the rear sprockets 61 and 62, the former of which is an idler supported by the shaft 63 and the latter is mounted on a shaft 64 driven from shaft 13 by the chain 65.

There is a liquid reservoir 66 mounted on the top plate 216 of the spitting head and provided with a depending drip pipe 68 so arranged as to deliver oil or other liquids to the strip immediately before it enters the crimping rolls. This pipe 68 is positioned in line with the needle 50 so that the liquid discharge therefrom will soften the strip and cause it to be more readily perforated by the needle. The use of a liquid is also of advantage in reducing the frictional resistance of the core to the distributing and spinning of the strip thereon. Instead of oil, alcohol or other liquid may be used. If desired, colored liquids may be used, which will tint or dye the paper in the vicinity of the perforations which will be formed by the needle, thereby producing an attractive effect in the finished article.

Liquids having sizing, stiffening, cementing, adhesive or waterproofing properties may also be used, as well as scents or perfumes. Obviously in using liquids for many of the purposes mentioned the same may be discharged from a reservoir at points not in alignment with the needle, for example upon the lateral edges of the strip.

It will be understood that various forms of needles may be used, but I prefer to use a needle which can be used to form a structure with either a thread or wire core and into which the thread or wire may be very readily inserted and securely held. The needle eye should provide for easy, rapid and secure rethreading, as well as removal of thread or wire, and in a manner that will not interfere with passage of material thereover. The needle will also desirably permit rotation or swivelling of the core.

Referring to Figs. 18 to 20, the needle shown comprises a body 50 formed of a pointed steel rod, and a tubular holder 173 secured thereto by a headed stud 174 having a threaded shank 175 which engages a similarly threaded bore in the end of the body 50. The holder 173 may freely swivel upon the stud 174, or it may be locked thereto by any suitable means, for example a set screw 176. The direction of the thread of the shank 175 should be such that swivelling of the holder upon the stud 174 will tend to tighten the stud with respect to body 50. The bore of the holder is provided with a series of internal projections 186, preferably formed integral therewith as by pressing or stamping.

In case the needle is to be used for the impaling of the strip upon a thread core, the forward end of the holder 173 will be closed by a removable plug 177 threaded therein. Within the holder is a slidable block 178 having a removable pin 179 extending therethrough. The ends of said pin are in engagement with guide slots 180 formed in the holder 173 whereby the block 178 is held against rotation.

The inner end of the block is shouldered as shown and a compression spring 181 bears at its respective ends against said shoulder and the head of the stud 174, thereby normally holding said block in the position shown. The block 178 is provided with a transverse cut or groove 182, the bottom of which has a recess 183, and the upper portion a cam surface 184. The holder 173 is formed with a transverse cut or slot 185 the depth of which is approximately the same as that of the groove 182.

In order to thread the needle, all that the operator needs to do is to hold the thread above the slot 185, in a direction at right angles to the axis of the needle and bring it down through said slot so as to press against the cam surface 184 of block 178. The pressure of the thread thereupon causes the block to move rearwardly, i. e., to the left (Fig. 18), sufficiently to permit the thread to enter the recess 183. At such moment the spring causes the block 178 to move to substantially the position shown, whereby the thread will be clamped and securely held between the rear surface of groove 182 and forward surfaces of slot 185. The threading operation can be performed in a very short interval of time.

In case the needle is to be used for the impaling of a strip upon a wire core the plug 177, block 178 and spring 181 will be removed from the holder 173. The wire will then be inserted therein and when of sufficient diameter will be firmly held by frictional engagement with the internal projections 186.

It will be understood that in some cases it may be desired to have the wire rotatable within the needle. Such result may be obtained either by eliminating the projections 186, or by using a wire of a diameter sufficiently small as to avoid frictional engagement therewith, or by inserting the wire only in that part of the holder 173 which is without internal projections.

In the form illustrated at Figs. 18a, 19 and 20, the forward end of the body 50 of the needle is desirably provided with an eye 69 which is substantially L-shaped, one arm of the L being cut through the body of the needle so that a thread or core e upon which the strip is to be spitted can be readily inserted by a lateral movement of the thread with respect to the needle. By inserting the thread near its end into the eye, then taking a single turn about the end of the needle and again inserting it into the eye as shown in Figs. 19 and 20, the thread e may be drawn tight and securely held. This procedure in practice can be carried out very quickly and easily and is very effective. The needle is preferably formed with an enlargement which may be a piece of metal tubing 50a secured thereto. By reason of such formation the hole or opening formed in the paper by the needle will be substantially greater than the diameter of the thread or core e, which is desirable, as it contributes to the ease which the convoluted structure will be formed.

The chain 51 travels continuously, and one of its functions is to move the free end of the crimped strip along the core e to enable it to be gripped by the mechanism by which the strip will be rotated. In order to carry out this step, a traveling or distributing carriage 70 is provided. (See Figs. 6, 7, 11, 12 and 13.) This carriage is in the form of a rectangular, boxlike structure having depending lugs 71 (Fig. 13), which are provided with rollers 71'. Said rollers engage longitudinal horizontal grooves in the side members of the frame. The chain 51 enters the carriage 70 through an opening 72, being supported on a guide or partition 73 having a curved forward edge as shown, over which the chain passes in a downward direction below a sprocket 74 mounted as an idler on shaft or pin 75. The chain 51 after leaving the idler passes through the opening 76 of the carriage, thence through opening 77 of the spinning head 78 (Fig. 14) having mechanism for the twisting of the strip which will be described later.

In order that the crimped strip may be carried through the machine at a high rate of speed, I have found it desirable to provide an endless upper holding chain 51', (Figs. 6 and 27) which is continuously driven at the same speed as the chain 51, by a drive sprocket 271 supported by the head 13' and driven from shaft 13 by any suitable means. The chain passes over idlers 272 and 273 carried by the distributing carriage 70, thence over idler 274 carried by the upright 275, thence over idler 276 carried by head 13' to drive sprocket 271. The chain 51' is composed of links of the same length as those of the chain 51 and those portions of the two chains between the head 13' and carriage 70 are always in close proximity to each other. Obviously the construction of Fig. 27 may be inverted if desired, so that the chain 51 will be above and the chain 51' below the strip.

In Fig. 28 I have shown a modification in which the upper chain 51a is an exact duplicate of the chain 51, but is inverted and disposed with its teeth in staggered relation to the teeth of the chain 51 so as to engage the depressions of the upper surface of the crimped strip while the teeth of the chain 51 engage the depressions of the lower surface of the strip.

The distributing carriage 70 has two functions. It travels from left to right (Fig. 6) at the speed of the chains 51 and 51' to cause the contiguous strands of the chains to close on the core e and feed therealong the crimped strip from the spitting head 13' to the housing 78, where it will be gripped by the rotating mechanism, and after it has been so gripped, the carriage 70 will be driven in a reverse direction, that is from right to left (Fig. 6), but ordinarily at a very much slower speed for the purpose of progressively stripping the chain from the crimped strip to free the latter so that the twisting thereof can be accomplished. The feeding means 51—51' and carriage 70 conjointly constitute means for causing uniform distribution of the crimped portions along the core e, particularly upon the return movement of the carriage, and the relative ratio of the speed of the feeding means and carriage controls the spacing of the crimped portions along the core e, such distributing means preventing piling up of the crimped portions along the part of the core e remote from the twisting means. The movement of the carriage to the left progressively enlarges the portion of the strip being twisted so that the twisting is more effective. When the carriage 70 reaches its extreme left hand position the structure will have been completed and may be removed from the machine as will be described later.

Fig. 12 shows the carriage 70 with parts so disposed as to cause the movement thereof toward the right. This movement is provided for by the locking of the carriage 70 to the chain 51 by the following means: There is a spur gear 79 fixed to the shaft 75 and a second spur gear 80 in mesh therewith, said last named gear being mounted on the pin 81 carried by link 82 which is loose upon shaft 75 so as to pivot thereon. When in the position shown in Fig. 12 the gear 80 is held against rotation by a vertically adjustable affixed tooth 83 rigid with the frame of the carriage 70. In such position, since neither the gear 80 nor 79 can rotate, the engagement of 79 with the chain 51 locks the carriage 70 to the said chain and the movement of the latter therefore causes movement of the carriage toward the right.

The means for moving the gear 80 into position to be locked by the tooth 83 and for holding the gear in such position comprises a horizontally disposed rod 84 (Figs. 11, 12 and 13). The forward end 85 of this rod is of reduced cross-section and is supported by a fixed member 86. The rod 84 is also provided with a sloping surface 87 which bears against the enlarged portion 88 of the pin 81 (see Fig. 11), whereby the movement of the rod 84 toward the right causes an upward movement of the pin 81 against the tension of spring 81' secured at its respective ends to pin 81 and stud 82' rigid with the carriage 70. The means for operating the rod 84 comprises an arm 89, one end of which is provided with a slot 90 through which passes a headed pin 91 rigid with said rod 84. The lower end of arm 89 is pivotally connected by pin 92 to an arm 93. The arms 89 and 93 together constitute a toggle which during the movement of the carriage 70 toward the right occupies the position shown in Fig. 12, the arms 89 and 93 being held in such position by the coil spring 94 secured at its ends to the pins 95 and 96, rigid with respective arms, upper and lower stops 93' being provided to limit the movement of said arms.

During the rearward movement of said carriage these parts are held in the position shown in Fig. 11, the movement of arms 89 and 93 being limited by the frame of the carriage 70. The arm 93 acts as a trigger or trip upon engagement with fixed stops 97 and 97' (Fig. 6) which are rigid with the frame 1 of the machine.

Assuming the parts to be in the position shown in Fig. 12 and the carriage 70 moving toward the right, the free end of the strip b will be upon the core e slightly in advance of the carriage, as shown. As the latter travels toward the right, it eventually reaches the spinning head 78 (see Figs. 6, 14 and 16). This head rests upon and is supported by the frame 1. It is provided with depending lugs 71 and rollers 71' similar to those of the distributing carriage 70. This construction enables it to be adjusted with respect to the frame to vary its distance from the spitting head 13', and suitable means such as a set screw 215 is provided to lock said head to the frame in any position of adjustment.

The spinning head is provided with means for gripping the free end of the strip b and rotating the same, which means comprises a sprocket 98 mounted on a horizontal shaft 99 and driven by the engagement therewith of the chain 51. The rotary movement of said shaft is communicated to a large spiral gear 100 mounted on a horizontal shaft 101 by a gear train 102, 102', 103 (Fig. 14). There is a spiral gear 104 in engagement with the gear 100, the former being mounted upon a horizontal hollow shaft or sleeve 105 which is rotatable upon a rod or tube 106 supported at one end by the wall of the head 78 and at the other by a bracket 107 secured thereto. Upon the rear end of shaft 105 is a drive wheel 108 having a leather facing 109 for the purpose of providing a friction drive for a pair of elongated rollers 110 which will be described later.

The forward end of shaft 105 is provided with a pair of gripping jaws 111, 111, (Figs. 14 and 25), which are pivoted on oppositely disposed pins 112 rigid with support 113 fixed to said shaft 105. A spiral spring 190 on each of four pins 112 bears against shaft 105 and jaw 111 to move the jaws from closed to open position, as shown in dotted lines, Fig. 14. The inner ends 191 of said jaws 111 are curved as shown, and there is an actuating member 192 slidable on the shaft 105 and having a cam surface 193 in engagement with said curved ends 191. The member 192 is normally held in the position shown in Fig. 14 by a coil spring 194 surrounding shaft 105, and bearing at one end against said member 192 and at the other end against a collar 195 fixed to shaft 105 as by a set screw 196. In this position, the cam surface of member 192 forces the jaws 111 together and retains them in such position.

Means are provided for moving the actuating member 192 against the action of spring 194 to permit the opening of jaws 111, and as shown such means comprise a lever 197 pivotally mounted on a horizontal rod 198 fixed to the head 78. The ends of the lever 197 are bent upwardly and terminate in forks 199 which are provided with pins 200 extending inwardly into engagement with a groove 201 formed in the member 192. The central portion of lever 197 has an upward extension to which is pivoted a push rod 202 which extends therefrom in an outward direction through the wall of the spinning head, and in position to be actuated by a plate or arm 203 (Fig. 12) secured to the distributing carriage.

The tube 106 upon which the hollow shaft 105 is mounted may be held against rotation by any suitable means, as for example by providing same with a rigid collar 204 (Fig. 14) which is locked to the frame of the spinning head by a removable headed pin 205. In some cases to be explained later it may be desired to unlock the tube 106 from the spinning head and lock it to the shaft 105 so that it will be rotated thereby. In such an event a flanged collar 206 is secured to the rod 106 by set screw 207 and surrounds the rear end of shaft 105 to which it may be united by set screw 208.

The rear end of the tube 106 is provided with means for enabling it to grip the core as for example when the core is a wire. Such means may comprise exteriorly threaded jaws 209 integral with said tube, and a nut 210 threaded thereon, said parts cooperating as in an ordinary chuck.

When the core e is a thread it extends through the hollow rod 106, and is supplied as needed from the spool or bobbin 117 (Fig. 16) from which the thread passes to a tension device 118 of usual construction, thence through said rod 106.

In Fig. 14 the parts are shown in the positions occupied while the distributing carriage 70 is bringing the free end of the strip b toward the right to be gripped by the jaws 111. The gripping is brought about by the following means:

One end of the rod 202 extends through the housing 78 toward the left in position to be engaged by the arm 203 of the distributing carriage 70 as it reaches its extreme right hand position. Such engagement causes a pivotal movement of the lever 197 upon the pin 198 which slides the cam member 192 toward the right against the action of the spring 194. This enables the springs 190 to move the jaws 111 from the position shown in full lines Fig. 14 to that shown in dotted lines, so that the forward end of the strip b will enter between the ends of the jaws in position to be gripped thereby.

A sprocket 127 is mounted as an idler on pin 128 carried by the housing 78; the chain 51 engages said idler and leaves the housing through an opening 129 formed in the wall thereof. The chain 51 after leaving the housing passes over an idler 130 at the extreme forward end of the machine (see Fig. 6). This idler acts as a belt tightener, being supported in bearings 131 carried by an upright 275. Said bearings extend through an opening in the bracket 133 rigid with the frame 1 and provided with an adjusting screw 132. The chain after leaving the idler 130 travels toward the left in a horizontal direction as indicated in Figs. 6, 10 and 16 until it reaches the idler 61, Fig. 10, said chain being endless and constantly driven, as previously described.

The movement of the distributing carriage 70 toward the right which has been described brings the free end of the strip b into position where it will be gripped by the jaws 111 of the rotating mechanism, and such gripping will be effected by automatic actuation of said jaws by the spring 194 immediately upon the disengagement of rod 202 by said carriage 70 upon its reverse movement. As soon as this occurs, the strip b will be twisted by reason of the rotation of the shaft 105 and jaws 111.

The reverse movement of the carriage 70, that is towards the left is brought about by reason of the engagement of the lower end of the lever 93 (Figs. 11, 12 and 13) with a fixed stop 97' carried by the frame 1 (see Fig. 6). This causes the toggle levers 89 and 93 to be thrown from the position shown in Fig. 12 to that of Fig. 11. This movement causes the rod 84 to be moved toward the left from the position of Fig. 12 which causes the spur gear 80 to descend by action of spring 81' from the position of Fig. 12 to that of Fig. 11 in which it engages a spur gear 141 mounted on a rotatable horizontal shaft 142. This shaft is provided with a sprocket 143 which by means of a chain 144 drives a sprocket 145.

The last named sprocket is mounted on a horizontal shaft 146 and there is a pinion 147 secured to said shaft and in engagement with a fixed rack 148 carried by frame 1. This rack extends along the entire distance traversed by the carriage 70 and since the gear 79 will be rotated by engagement of the chain 51 with sprocket 74, such movement will be transmitted through the gears 80 and 141, sprocket 143, chain 144, sprocket 145, and shaft 146 to the pinion 147, which by reason of its engagement with the rack 148 will cause the carriage 70 to travel from right to left, but usually at a speed very much less than that at which it traveled in a right hand direction.

Such relatively slow movement of the carriage 70 toward the left is for the purpose of decreasing the spacing or causing a compacting of the folds or crimps of the strip to a sufficient degree to enable the convoluted structure to be formed by the twisting of the strip. This feature is clearly shown in Fig. 11, from which it is clear that since there is a continuous feeding of crimped strip toward the right by the chain 51, there will be a compacting of material after it leaves the chain for the reason that the carriage 70 is moving toward the left so slowly that the number of folds of the strip $b$ per inch of core is greater and the folds therefore are compacted. The spacing of the folds, and hence the compactness thereof, depends on the relative speeds of the carriage 70 and feeding means 51—51', and the spacing preferably is decreased as the diameter of the article to be formed is greater, since in the finished products the convolutions should be preferably substantially perpendicular to the axis and close together. When the spacing is too great the convolutions when formed are liable to flare too much at the edges, being compacted only at the center. The spacing of the folds under the control of distributing means 50—51'—70 is therefore, dependent upon the kind of article to be produced and such spacing or the compactness of the folds may be varied accordingly.

The action of the carriage 70 in progressively releasing the chain 51—51' to allow the twisting also insures the production of a uniform article, because it is easier to initially twist short portions and to progressively increase the length of the portions to be twisted when the first twisted portions become sufficiently stiff to transmit the twisting power to the more remote portions.

As the carriage moves toward the left, the parts are in the positions shown in Fig. 11, and as the arm 93 contacts with the stop 97, the parts will be thrown from the positions of Fig. 11 to those of Fig. 12, whereupon the movement of the carriage 70 toward the left ceases and the mechanism is properly set for its movement toward the right.

At this moment the machine is stopped in order to permit the removal of the finished structure and the rethreading of the needle for the manufacture of another. These steps are readily accomplished as follows:

A dog 211 is pivoted on a pin 210' and held against movement in one direction by a stop 212 rigid with the carriage 70. A switch 213 having a pivoted arm 214 which controls the line circuit of the electric motor 9 is mounted on the frame 1 in such position that the upper end of arm 214 will be engaged by dog 211 upon the return of the carriage 70 and the circuit opened and motor 9 stopped at the desired moment, that is immediately upon the completion of the convoluted structure.

There is a slidable cutter 149 mounted on the carriage 70 (Figs. 11 and 24). It normally occupies the position shown, being held in such position by the action of the compression spring 150, the ends of which bear respectively against the top of the carriage and the flange 151 of said cutter. The lower end of the cutter is provided with a stop 152 which slides in the guide slot 153 formed in the wall of the carriage 70 so as to limit the upward movement of the cutter. By pressing downward upon the flange 151 the blade 154 cooperates with a cutting edge formed on the plate 155 secured to the carriage and severs the strip. The lower edge of the blade 154 is provided with notches 215 which receive the head of the needle or needles as the cutter is actuated to sever the finished structure.

The point at which the structure is severed is slightly to the rear of the eye of the needle, so that when the structure is removed from the machine the needle eye will be exposed for the rethreading operation. The core $e$ is not severed by the blade 154 but when a thread is used it is ordinarily broken by a jerk as the operator removes the finished structure.

On account of the fact that the chain 51 which feeds the individual folds of the strip along the core and causes them to be compacted is narrow as compared with the strip, the resistance against being compacted of the portions of the strip which are out of line with the chain have a tendency to cause the side edges of the folds to be bent rearward, before they are spun, and for this reason the distance between the cutter 149 and the plane where spinning occurs should be a minimum. The core $e$, which as described is a thread (as distinguished from a wire which will be hereinafter described) is thereupon severed by any suitable means at the point where it is gripped by the jaws 111, and the finished structure removed from the machine.

Inasmuch as the jaws grip the core $e$ at a distance from end of hollow rod 106, and the core is severed at the point of the jaws, a suitable length of thread extends rearward from said rod which enables the operator to grasp the end of the thread and draw through said rod from the spool enough thread for the rethreading of the needle for production of another convoluted structure. After such rethreading, the core is drawn tight by drawing it in a reverse direction through the tension device and the machine is in suitable condition to form the next structure. The operator thereupon throws the switch arm 214 toward the right to close the switch 213 and thereby sets the machine again in motion to carry out the sequence of steps before described.

In practice, the carriage 70 will ordinarily be fed to the right at the same speed as the chain 51, but its rate of speed in a reverse direction will vary according to the nature of the structure to be produced, that is it may travel very slowly to produce a highly compact convoluted structure, or less slowly to produce one with fewer convolutions per inch, or its speed may be variable to produce novel or unusual types of structure, in which there are alternating sections or blocks of structure of different degrees of compactness. The designing of gearing suitable for producing speed changes of the character and for the purpose mentioned will be obvious to anyone skilled in machine design. For example, the gear 80 instead of being brought into engagement with gear 141 so as to drive the same, may carry a gear capable of being removed and replaced by one of different size, said removable gears meshing with removable gears of suitable size to be mounted on shaft 142, and removable elliptical gears may be used for producing a variable feed.

In the apparatus which has been described up to this point the strip $a$ has been formed into two strips $b$ and $c$ respectively (Fig. 8) and each of these strips has been formed into a complete structure of tapered form, as in Fig. 4.

Obviously instead of forming the structure with a single taper as shown, one may by increasing the width of the strip $a$ and the rate of lateral movement or feed with respect to its forward movement or feed, increase the degree of taper of the strips $b$ and $c$ to such an extent that the finished structure will be formed of a plurality or even a multiplicity of independently or separately tapered sections arranged end to end. In forming non-tapered structures, as for example those of Figs. 1 to 3 inclusive, and especially structures of considerable length, I prefer to make use of the elongated rollers 110 illustrated in Figs. 6, 7, 12, 13 and 14 and 15 which are disposed in pairs, and are for the purpose of assisting in the twisting of the strip by applying a friction drive along the entire length of the developed structure which rests upon the rollers and is rotated by frictional engagement therewith. (See more particularly Figs. 11 and 15.)

The rollers 110 are preferably covered with felt, leather, or other material which will increase the frictional effect thereof, or their surfaces may be knurled or otherwise roughened for the same purpose. Said rollers are supported at their rear ends by a plate 134, Figs. 14, 16 and 23, having a horizontal slot 135 through which the rollers extend. The plate 134 is secured to the wall of the housing 78 and is adjustable in a vertical direction by means of a slot 136 formed in the plate 134 and engaging a pin 137 which is rigid with the housing 78, suitable clamping means being provided and as shown consisting of a wing nut 138 threaded on a pin 139 which is rigid with the housing 78.

There are diagonally extending slots or openings 140 formed in the wall of the housing 78 through which the rollers 110 extend and by reason of the inclination of these slots the distance between the rollers 110 may be varied; that is, as the supporting plate 134 is adjusted upward in a vertical direction the rollers 110 will be brought towards each other by reason of the inclination of the slots 140. In Fig. 23 the rollers are shown as occupying the upper ends of the slots 140 and therefore being in one extreme position of adjustment, and in dotted lines as shown the structure $f$ resting upon and in position to be rotated by said rollers 110. In Fig. 16 the rollers are shown at the lower ends of the slots 140 and therefore in their other extreme position of adjustment. The forward ends of the rollers 110 pass through large openings in the traveling carriage 70, and an adjustable support similar to the plate 134 of Fig. 23 is applied to the spitting head for the support of the rear ends of said rollers.

When the rollers 110 are adjusted as described, the drive wheel 108 will be removed and replaced by another one of different diameter suitable for driving the rollers in their new position.

In order to form the structure of Fig. 1, the only changes necessary to make in the apparatus are to remove the cutter shaft 2' (Fig. 8), the cams 40 and 41 and the guides 14, 14, and shift the guides 34 and 35 or 36 and 37, the latter being secured to shaft 38 by set screws 38', whereby the strip $a$ will be fed directly from the guides to the belts 43 and 44 by which it will be fed into the crimping rolls. Two identical structures can be made simultaneously side by side, each made from a single strip which can be fed between either the top or bottom pairs of belts (Fig. 9) to the crimping rolls.

In order to form the strip of Fig. 5, it is necessary to provide the apparatus arranged as just described with a pair of driven crimping rolls such as are shown in Fig. 22 at a point between the guides 14 and the belts 43 and 44, or if desired at some point in the spitting head 13'. For example one may remove the guides 14, cutter 2, cutter shaft 2' and roller 222 and shaft 223 and replace the latter by the shaft of the lower crimping roll of Fig. 22. Crimping rolls of this type will simply crimp the margins of the strip and the latter will be handled in the machine in the same way as an ordinary strip having plain edges. The appearance of the finished article, however, will be considerably different from that of the structure of Fig. 1, and I have termed it a super-crimped structure.

Furthermore, the structure of either Fig. 1, Fig. 1a, Fig. 2 or Fig. 3 may be made of a super-crimped strip or strips, Fig. 5.

The strip of Fig. 5 may be formed into a convoluted structure as just described, or if desired, it may be used as an untwisted strip as shown in Fig. 5 or as a twisted uncompacted strip without a core, as in Fig. 5a.

It is a highly ornamental and useful strip when used in any one of several different ways.

In order to form the structure of Fig. 3, it is necessary to use two strips and to superpose one upon the other. This may be readily done in the machine shown (see Fig. 9) when arranged for producing the structure of Fig. 1. There are two rolls from which strips $h$ and $h'$ will be respectively drawn. The lower strip $h'$ will be fed to the belts 43 and 44 and the upper strip $h$ will be fed in a similar manner to the belts 43' and 44'. The two strips will be superimposed as they enter the crimping rolls and from that point on will be treated by the machine in exactly the same manner as a strip of single thickness. The appearance of the finished article, however, may be very different from that of Fig. 1, since the two strips $h$ and $h'$ may be of differently colored paper and if desired they may be of different widths of either the same or differently colored papers, or one or both strips may be off center with respect to the core. In either case, the appearance of the finished article will be quite different from that of Fig. 1.

Fig. 5b illustrates (in transverse section) several ways in which two strips may be superimposed. The first or top view shows two strips $h$ and $h'$ of equal width as in Fig. 3. The remaining views show the strips of unequal width as $h2$ and $h3$, $h4$ and $h5$, $h6$ and $h7$, $h8$ and $h9$, and $h10$ and $h11$. Each of these combinations of two strips will produce a structure which differs greatly in appearance from any of the other structures, and furthermore, by varying the portion of the core $e$, with respect to the central line of the strip as explained in the next paragraph various other novel forms of structure may be produced.

The structure of Fig. 1a is produced by so arranging the guides 34, 35, or 36, 37 that the needle 50 will impale the strip $a$ at a point to one side of the center of the strip, or by using crimping rolls having a needle disposed at one side of a plane equidistant from the ends of the rolls, and feeding the strip centrally with respect to such plane, thereby producing what may be termed a "staggered" structure. Any of the various structures described herein may be formed in such manner to produce a different effect from that shown.

The structure of Fig. 2 is made by the alternate use of strips of differently colored paper so that the finished article is a succession of blocks of different color, one color, for instance red, being indicated in Fig. 2 by the block $i$ and another color, for example green, being indicated by the block $k$.

In order to form a structure of this character the special attachment shown in Fig. 17 may be used. This structure shows the machine viewed in the opposite direction from that of Fig. 9. The principle upon which this structure operates is the alternate locking of the rolls 6, 6 Fig. 17 by which the feed of the rolls $d$ of strip are controlled and the gears 238 and 243, Fig. 26 so that the action of the crimping rolls will cause the tearing or severing of the strip which is locked against being fed. The simultaneous unlocking of the feeding means for the other strip causes it to be fed into the crimping rolls at the time the first strip has been locked against feed, and therefore severed. Consequently there will be a continuous succession of pieces of strip of different color fed into the crimping rolls and carried through the machine in the manner previously described.

Referring to Fig. 17, the strip $i$ is shown as being supplied from the forward roll and the strip $k$ from the rear roll of paper, these strips being of different color. The belt 8 which is driven from the motor 9 through the spiral gears 10, 10' and shaft 11 travels in the direction shown by the arrows and drives a pulley 156 which drives a chain 157 and sprocket 158 mounted on the shaft 159.

A cam 160 is fixed to shaft 159 and is provided with two circular cam surfaces 161 and 162 respectively. A pivotal lever or dog 163 is mounted on pivot 164 carried by the frame 1 and roller 165 is mounted on the lower end thereof which roller is held against the cam surface by a tension spring 166, one end of said spring being secured to the bearing 167 of the shaft 159 and the other end to the end of lever 163. In the position shown the lever 163 permits rotation of the rear feed roll 6 and locks the forward feed roller against rotation by reason of engagement of the lever 163 with the ratchet teeth 168 formed on said roll. In this position the strip $i$ is held firmly.

It will be noted Fig. 17 that the lever 163 is provided with an electrical contact plate 250 secured thereto and electrically connected by flexible conductor 251 with a source of potential 252. A stationary contact plate 253 is secured to the frame 1 and provided with fixed contacts 254 and 255 so situated as to be contacted by the plate 250. In the position shown the contact 255 is engaged by plate 250 and a circuit is thereby closed through an electromagnet 256 the terminals of which are connected respectively with contact 255 and source of potential 252 by conductors 257 and 258.

Referring to Fig. 26, the magnet 256 is provided with a vertically movable armature 259 which is normally held in a depressed position by a coil spring 260. Upon closing the circuit as above described however, the armature 259 is caused to rise into the position shown, whereby the upper end of the armature engages the teeth of the gear 243 and thereby locks the shaft 244 against rotation. Such locking causes the locking of the rollers by which the belts 43 and 44 are driven and causes the strip $i$ to be torn apart at a point between the belts 43, 44 and crimping rolls 45, 46.

The locking of shaft 244 does not interfere with rotation of shaft 233 on account of the friction clutch 236 being interposed between said shaft and gear 235. Consequently the upper belts 43' and 44' will not be interfered with and the strip $k$ will be fed into the crimping rolls and spitted onto the needle and core of the machine.

As soon as the cam surface 162, Fig. 17 causes the lever 163 to be moved in such position as to release the left hand feed roll 6 and lock the right hand feed roll 6, the contact plate 250 will engage fixed contact 254 and close a circuit through an electromagnet 261 the terminals of which are connected respectively with contact 254 and source of potential 252 by conductors 262 and 258.

The magnet 261 is provided with vertically movable armature 263 which is normally held in an elevated position by a coil spring 264. Upon the closing of the circuit as just described, the armature 263 is caused to descend against the action of said spring into a position in which its lower end engages the teeth of the gear 238, thereby locking the shaft 239 against rotation. Such locking causes the locking of the rollers by which the belts 43' and 44' are driven and causes the strip $k$ to be torn apart at a point between the belts 43', 44 and crimping rolls 45, 46. The locking of shaft 239 does not interfere with rotation of shaft 230 on account of the friction clutch 236 between said shaft and gear 234. Consequently the operation of the lower belts will not be interferred with and since the magnet 256 was necessarily de-energized before the magnet 261 was energized, its armature 259 was caused to descend by action of spring 260 thereby releasing the gear 243 and permitting the belts 43 and 44 to be driven. Therefore the strip $i$ will be fed into the crimping rolls and spitted onto the needle core of the machine.

The cam surfaces 161 and 162 are so designed as to produce a short interval during which both the upper and lower strips $i$ and $k$ will be fed, as when the cam roller 165, Fig. 17 is travelling from 161 to 162. This causes the advancing end of the strip for example $i$ to overlap the strip $k$ within the crimping rolls before the locking of the means for the feeding of strip $k$ causes it to be severed. Such overlap is necessary in order to enable the spinning operation to be performed as described in connection with a continuous strip. By reason of such overlap the compacted strip is practically continuous from a mechanical point of view. Thus the strips $i$ and $k$ will be alternately fed into the machine and form a structure consisting of a succession of differently colored blocks.

By obvious changes strips of successive blocks of three or even more colors may be produced, all that is required being the duplication of the means for holding the rolls of strip and feeding the strips into the crimping rolls, and the replacing of cam 160 and arm 163 with mechanism suitable for causing successive locking and unlocking in sequence of all of the holding and feeding means. Special cams may be used whereby the relative lengths of the differently colored blocks will be varied, that is the blocks may be of uniform length as by using a cam such as 160, or the blocks of one color may be longer or shorter than those of another color or colors, whereby different ornamental effects are obtainable in unlimited variety. Staggered and double layer types of structure may also be made of successive blocks as above described.

In any or all of the forms referred to, the core $c$ may be either a thread or a length of wire. The manner in which a thread may be used has been fully described and I shall now indicate how a convoluted structure may be formed upon a wire core.

In case one desires to use a roll of wire of sufficient length to provide cores for a number of structures, it may be carried on a reel or spool situated conveniently and drawn through the hollow rod 106 to the gripping jaws 111, in which case a wire straightening device of well known construction will be placed in position to straighten the wire as it enters the bore of said rod. In preference to such construction, the wire may be in straight pieces of a length suitable for the structure to be formed. One end of such wire will be inserted in the holder 173 of the needle 50 and the other end will be inserted within the rear end of the tube 106 and the nut 210 turned to cause the jaws 209, Fig. 14, to firmly clamp the wire.

The tube 106 may be permitted to rotate with sleeve 105 to thereby rotate the wire core as well as the paper strip gripped by the jaws 111, but in such case, if the wire is held by the internal projections 186 of the needle the holder 173 will by loosening of set screw 176 be permitted to swivel upon the needle but if the wire is loose in the holder, it is not necessary to loosen the set screw.

In case the tube 106 is permitted to rotate as just described the jaws 111 may be done away with for the reason that the wire core will itself cause the rotation or spinning or twisting of the strip. This is due to the fact that the strip is compacted on the core and as soon as any twisting due to friction occurs the wire and strip become clutched together by reason of the diagonal position assumed by the individual folds or crimps of the strip with respect to the core.

Optionally the rod 106 may be held stationary by loosening of set screw 207 or 208 (Fig. 14) and the insertion of pin 205 through aperture in collar 204, and in such case the jaws 111 will spin the strip upon the core, and holder 173 may be either allowed to swivel upon needle 50 or held against swivelling.

In using a wire core with tube 106 stationary, the jaws 111 will be formed with an aperture 111a as shown through which the core extends, so that the jaws engage only the strip. In case a thread is used as core the aperture 111a may be omitted and the jaws 111 will then grip and rotate the core as well as the strip.

The operation of the other parts of the apparatus proceeds as in the manner described until the structure has been completed whereupon the operator simply cuts the structure, pulls the rear end of the core out of the holder 173, releases the forward end of the core from the chuck formed on the end of tube 106, and removes the completed structure, thereupon inserting a new core and proceeding as before.

Having now described my invention, what I claim is:

1. In a machine of the class described, the combination of means for crimping a strip, means for inserting a core through the individual folds, and means for twisting the strip after insertion of said core.

2. In a machine of the class described, the combination of means for crimping a strip, means for inserting a core through the individual folds, means for compacting the folds, and means for twisting the compacted strip.

3. In a machine of the class described, the combination of means for crimping a strip and inserting a core through the folds thereof, means for feeding the cored portion of said strip into a compacting space, and means for progressively enlarging said space at a slower rate than the feed of said cored portion.

4. In a machine of the class described, the combination of means for crimping a strip and inserting a core through the individual folds thereof, means for gripping and rotating the cored portion, and means for feeding cored strip toward said gripping means during the rotation thereof.

5. In a machine of the class described, the combination of means for crimping a strip and inserting a core through the individual folds thereof, means for gripping and rotating the core, and means for feeding cored strip toward said gripping means during the rotation thereof.

6. In a machine of the class described, the combination of means for crimping a strip and inserting a core through the individual folds thereof, means for gripping and rotating the core and the cored portion of the strip, and means for feeding cored strip toward said gripping means during the rotation thereof.

7. In a machine of the class described, the combination of means for crimping a strip and inserting a core through the folds thereof, rotary gripping means, and feeding means for carrying the free end of the cored strip from said core inserting means toward said gripping means.

8. In a machine of the class described, the combination of means for criming a strip and inserting a core through the folds thereof, means for rotating the cored strip, and a member for engaging the cored strip and advancing it from a point adjacent the core inserting means to a point adjacent the rotating means.

9. In a machine of the class described, the combination of means for crimping a strip and inserting a core through the folds thereof, means for twisting the crimped strip comprising rolls extending longitudinally of the crimped strip, and means for driving said rolls.

10. In a machine of the class described, means for feeding a pair of strips, means for crimping said strips, and means for alternately arresting and permitting the feeding of each of said strips to cause its severance into pieces of predetermined length.

11. In a machine of the class described, means for crimping and spitting a strip, a travelling carriage, and means cooperating with said carriage for causing the compacting of the folds of said strip.

12. In a machine of the class described, the combination of means for supporting a plurality of strips, means for feeding said strips into superposed relation to each other, means for forming crimps in the superposed strips, means for inserting a core through the individual folds, means for compacting the folds, and means for twisting the compacted strips.

13. In a machine of the class described, the combination of means for crimping one or both of the marginal edges of a strip, means for forming in another portion of the strip crimps of a shape different from the marginal crimps, means for inserting a core through the individual folds of some of the crimps, means for compacting the folds, and means for twisting the compacted strip.

14. In a machine of the class described, the combination of means for revolubly supporting a rolled strip, said means comprising a driven member by which said strip is supported, means for forming crimps in the strip, means for inserting a core through the individual folds, means for compacting the folds, and means for twisting the compacted strip.

15. In a machine of the class described, the combination of means for crimping a strip and inserting a core through the folds thereof, means for twisting the crimped strip including a hollow shaft, said core passing through said shaft, and core supplying means beyond the shaft.

16. In a machine of the class described, the combination of means for supporting and feeding a strip, and means for crimping the same along its marginal edges, said crimps extending only partially across the strip.

17. In a machine of the class described, the combination of means for supporting a pair of strips, means for guiding said strips into superposed relation to each other, means for forming crimps in said strips, means for inserting a core through the individual folds, and means for arresting and feeding each strip in alternation to cause it to be severed after it has been overlapped by the other strip.

18. In a machine of the class described, the combination of means for crimping a strip and inserting a core through the folds thereof, means for rotating the cored strip, a member for engaging the cored strip and advancing it from a point adjacent the core inserting means to a point adjacent the rotating means, and means for retaining the strip in engagement with said member.

19. In a machine of the class described, means for crimping a strip, means for inserting a core through the individual folds, means for compacting the folds, and means for twisting the compacted strip, the compacting means extending into close proximity to the plane at which the untwisted material is formed into a convolution.

20. The method of producing a convoluted structure which consists in progressively feeding and crimping a strip of flexible material, inserting a core through the individual folds thereof, compacting the cored folds, and twisting the compacted structure while material from the crimping means is being added to its length.

21. The method of producing a convoluted structure which consists in progressively feeding and crimping a strip of flexible material, inserting a core through the individual folds thereof, compacting the cored folds, and twisting the compacted structure between a fixed point and a point which recedes from the fixed point during the twisting operation.

22. In a machine of the class described, the combination of a needle having at one end a point and at the other end a socket adapted to receive a semi-rigid core, means for spitting a strip of flexible material on said needle and core, and means for rotating said core.

23. In a machine of the class described, the combination of a needle having at one end a point and at the other end a socket adapted to receive a semi-rigid core, means for spitting a strip of flexible material on said needle and core, and means for rotating said material.

24. In a machine of the class described, the combination of a needle having at one end a point and at the other end a member swiveled thereto and having a socket adapted to receive a semi-rigid core, means for spitting a strip of flexible material on said needle and core, and means for rotating said core.

25. In a machine of the class described, the combination of a needle having at one end a point and at the other end a member swiveled thereto and having a socket adapted to receive a semi-rigid core and having projections for frictionally engaging the same, means for spitting a strip of flexible material on said needle and core, and means for rotating said core.

26. In a machine of the class described, the combination of a needle having at one end a point and at the other end a socket with frictional means for receiving and frictionally holding a semi-rigid core, means for spitting a strip of flexible material on said needle and core, and means for rotating said material.

27. In a machine of the class described, the combination of a needle for supporting a core at one end, means for supporting the core at a point spaced therefrom, means for crimping a strip and feeding the same upon the needle and core, and means at said spaced supporting means for twisting the strip.

28. In a machine of the class described, the combination of means for supporting a core in extended condition, means for feeding a crimped strip thereon, and means for twisting the strip.

29. In a machine of the class described, the combination of means for supporting a core in extended condition, means extending along the core for feeding a crimped strip thereon, means for twisting said material, and means for disengaging said feeding means from the strip to allow the twisting operation.

30. In a machine of the class described, the combination of means for supporting a core at spaced points in extended condition, means at one of said points for crimping a strip and threading the same upon the core, means traveling the length of the core for distributing the folds uniformly thereon, and means for twisting the strip.

31. In a machine of the class described, the combination of means for supporting a core, means at one end of the core for crimping a strip and threading the same upon the core, strip twisting means at the opposite end of the core, and means for distributing the strip folds along the core uniformly.

32. In a machine of the class described, the combination of means for crimping a strip, means for inserting a core through the folds, means for controlling the distribution of the folds along the core, and means for twisting the strip.

33. In a machine of the class described, the combination of means for supporting a core in extended condition, means at one end thereof for crimping a strip and threading the same upon the core, strip twisting means at the other end of the core, and means movable lengthwise of the core for causing uniform distribution of the folds thereon, said means operating to disengage said strip upon movement towards said crimping means to allow the twisting operation.

34. In a machine of the class described, the combination of means for supporting a core at spaced points, means at one end of the core for crimping a strip and threading the same upon the core, strip twisting means at the opposite end of the core, feeding means for distributing the folds along the core, and a traveling carriage movable towards and away from said twisting means and cooperating with said feeding means to cause the fold disengaging point thereof to move lengthwise of the core.

35. In a machine of the class described, the combination of means for crimping a strip, strip twisting means, means for engaging the strip folds and feeding the same along a core towards said twisting means, means for disengaging said feeding means from the strip folds, and means for moving said last named means to cause the fold disengaging point of said feeding means to advance to and recede from said twisting means as the folds are so fed.

36. In a machine of the class described, the combination of means for crimping a strip, strip twisting means, means for engaging the strip folds and feeding the same along a core towards said twisting means, and means for deflecting said feeding means to disengage the folds, said last named means being movable to cause the fold disengaging point of said feeding means to recede from said twisting means as the folds are fed, whereby to uniformly distribute the folds along the core and free the same for the twisting operation.

37. In a machine of the class described, the combination of means for crimping a strip, strip twisting means, means for engaging the strip folds and feeding the same along a core to said twisting means, strip gripping means on said twisting means, means for disengaging the feeding means from the folds, said last named means being movable towards and away from said twisting means for causing the fold disengaging point of said feeding means to advance to and recede from said twisting means as the folds are so fed, and means actuated by said movable means for operating said gripping means.

38. In a machine of the class described, the combination of means for crimping a strip, strip twisting means, an endless conveyor for feeding the strip folds along a core towards said twisting means, and means for disengaging the conveyor from the folds, said last named means being movable between said crimping means and said twisting means and cooperating with said conveyor for causing the effective fold disengaging point thereof to advance and recede from said twisting means as the folds are fed.

39. In a machine of the class described, the combination of means for crimping a strip, strip twisting means, an endless conveyor movable continuously in one direction to feed the strip folds along a core towards said twisting means, a carriage movable towards and away from said twisting means and cooperating with said conveyor to deflect a portion thereof out of engagement with the folds, the movement of said carriage causing the fold disengaging point of said conveyor to advance to and recede from said twisting means as the folds are fed, and means for actuating said carriage in both directions by said conveyor.

40. In a machine of the class described, the combination of means for crimping a strip, strip twisting means, an endless conveyor for feeding the strip folds along a core towards said twisting means, and a carriage movable towards and away from said twisting means and cooperating with said conveyor to deflect a portion thereof out of engagement with the folds, the movement of said carriage causing the fold disengaging point of said conveyor to advance and recede from said twisting means as the folds are fed, means for connecting said carriage to said conveyor to cause the same to travel towards said twisting means at the same speed as the conveyor, means for disconnecting the carriage at the end of the travel thereof and means for actuating said carriage from the conveyor for return movement at a slower speed.

41. In a machine of the class described, the combination of means for crimping a strip and inserting a core through the folds thereof, rotary gripping means, means for carrying the free end of the cored strip from said core inserting means toward said gripping means, and means controlled by said means for operating said gripping means.

42. In a machine of the class described, the combination of means for crimping a strip and inserting a core through the folds thereof, rotary gripping means, a feeding means movable towards said gripping means for carrying the free end of the cored strip from said core inserting means toward said gripping means, means controlled by said feeding means for operating said gripping means, and means for reversing the movement of said feeding means.

43. In a machine of the class described, the combination of means for crimping a strip and inserting a core through the folds thereof, means for engaging the cored portion and feeding the same along the core towards the opposite end thereof, and means for disengaging said feeding means from the folds, said last named means being movable to cause the fold disengaging point of said feeding means to travel along said core in both directions, whereby to cause uniform distribution of the folds thereon.

44. In a machine of the class described, the combination of means for crimping a strip and inserting a core through the folds thereof, means for engaging the cored portion and feeding the same along the core towards the opposite end thereof, and means for disengaging said feeding means from the folds, said last named means being movable to cause the fold disengaging point of said feeding means to travel along said core in both directions, whereby to cause uniform distribution of the folds thereon, said last named means travelling at a slower rate than the feeding means as said disengaging means approaches said crimping means, whereby to decrease the spacing between the folds.

45. In a machine of the class described, means for feeding a plurality of strips in overlapping relation, and means for intermittently interrupting the feeding of each strip to cause the severance thereof into pieces.

46. In a machine of the class described, means for feeding a plurality of strips in overlapping relation, means for intermittently arresting the feeding of each of said strips to cause the severance thereof into pieces, means for crimping the resulting composite strips and distributing the same upon a core, and means for twisting said composite strip.

47. In a machine of the class described, means for feeding a plurality of strips into superposed relation to each other, means for forming crimps in the superposed strips and distributing the folds thereof on a core, and means for twisting the cored portion.

48. In a machine of the class described, the combination of means for crimping a strip and inserting a core through the folds thereof, means for gripping and rotating the end of the crimped strip, friction rolls extending longitudinally of the crimped strip, and means for driving said rolls.

49. In a machine of the class described, means for longitudinally severing a strip along a diagonal line to form a pair of reversely tapered strips, means for crimping each of said tapered strips, means for inserting cores through the individual folds thereof, and means for twisting the compacted strips.

50. In a machine of the class described, the combination of an endless flexible member, means for rotatably supporting a rolled strip thereon, said endless member serving to unroll said strip, means for forming crimps in the strip, means for inserting a core through the individual folds, and means for twisting the strip.

51. In a machine of the class described, the combination of means for revolubly supporting a rolled strip, means for feeding said strip, a cutter for severing said strip in a longitudinal direction, means for progressively feeding said strip laterally before it reaches said cutter, means for crimping and inserting a core through the folds of each of the portions of said strip, and means for twisting the strips.

52. In a machine of the class described, means for longitudinally severing a strip along a diagonal line to form a pair of reversely tapered strips, guides for engaging the edges of said strips, and rotary means for increasing and decreasing the distances between said guides to correspond with the variation in width of said strips.

53. In a machine of the class described, the combination of means for crimping a strip and inserting a core through the folds thereof, means for rotating the forward end of the cored strip, an endless flexible member travelling from a point adjacent the core inserting means to a point adjacent the rotating means, and a reciprocatory carriage associated with said member and provided with means for lowering that portion of the endless member between it and the rotating means.

54. In a machine of the class described, the combination of means for crimping a strip and inserting a core through the folds thereof, a rotary gripping means, strip engaging and feeding means including a carriage for carrying the free end of the cored strip from said core inserting means toward said gripping means, means controlled by said carriage for operating said gripping means, and means adjacent said gripping means for reversing the movement of said carriage.

55. In a machine of the class described, the combination of means for crimping a strip and inserting a core through the folds thereof, means for rotating the forward end of the cored strip, an endless flexible conveyor for feeding the strip thereto, a carriage for deflecting a portion of said conveyor out of engagement with the folds, said carriage controlling the fold disengaging point of said conveyor and movable towards and away from said rotating means, a fixed rack, means carried by the carriage for gearing said endless conveyor to said rack, and means for disconnecting said gearing means.

56. In a machine of the class described, the combination of means for crimping certain of the marginal edges of a strip, means for differentially crimping the strip, means for inserting a core through the crimps and distributing the folds thereon, and means for twisting the strip.

57. In a machine of the class described, a rotating member having an opening for receiving a core, means in spaced relation thereto for crimping a strip, means for feeding the folds along said core, jaws on said rotating member for gripping said strip, and a cam movable on said rotating member and actuated by said feeding means for controlling said jaws.

58. In a machine of the class described, the combination of means for crimping a strip and inserting a core through the folds thereof, strip twisting means, endless conveyors adapted to engage the strip at opposite sides and feed the same along said core, and means cooperating with said conveyors and movable back and forth to cause the fold disengaging point of said conveyors to travel back and forth along the core.

59. In a machine of the class described, the combination of a core supporting means for supporting a core at spaced points, means at one of the core supporting means for twisting a crimped strip on the core, and means movable between said core supporting means and traveling away from and relative to said twisting means to progressively increase the length of the strip available for twisting during the twisting operation.

60. In a machine of the class described, the combination of a core supporting means, strip twisting means at one end thereof, means for feeding crimped strips on said core uniformly thereover, and means controlling said feeding means to progressively increase the extent of strip available for twisting during the twisting and feeding operation.

61. The method of producing a convoluted structure which consists in crimping a strip of flexible material, inserting a core through the folds thereof, and twisting the structure between a fixed point and a point which recedes from the fixed point during the twisting operation.

62. The method of producing a convoluted structure which consists in crimping a strip of flexible material, inserting a core through the folds thereof, and progressively twisting enlarging sections of said structure by application of the twisting power at one end thereof and transmitting the same to the untwisted portions through the twisted portions.

63. The method of producing a convoluted structure which consists in crimping a strip of flexible material, inserting a core through the folds thereof, and twisting continuously increasing portions of the structure while continuously feeding and uniformly distributing crimped material along the core.

In testimony whereof, I have signed my name hereto.

VICTOR T. HOEFLICH.